(12) United States Patent
Appa et al.

(10) Patent No.: US 8,073,824 B2
(45) Date of Patent: Dec. 6, 2011

(54) DATA INDEXING AND COMPRESSION

(75) Inventors: Jamil Appa, Filton (GB); David Fin William Standingford, Filton (GB)

(73) Assignee: BAE Systems PLC, London (GB)

( * ) Notice: Subject to any disclaimer, the term of this patent is extended or adjusted under 35 U.S.C. 154(b) by 464 days.

(21) Appl. No.: 12/177,586

(22) Filed: Jul. 22, 2008

(65) Prior Publication Data

US 2009/0012931 A1    Jan. 8, 2009

(30) Foreign Application Priority Data

Jun. 4, 2007 (EP) .................................. 07270029
Jun. 4, 2007 (GB) .................................. 0710508.3

(51) Int. Cl.
*G06F 7/00* (2006.01)
*G06F 17/00* (2006.01)
(52) U.S. Cl. ........ 707/693; 707/711; 707/741; 707/957; 709/247; 715/242
(58) Field of Classification Search .................. 707/600, 707/711, 741, 957, 693; 709/247; 715/242
See application file for complete search history.

(56) References Cited

U.S. PATENT DOCUMENTS

| | | | | |
|---|---|---|---|---|
| 7,315,849 B2 * | 1/2008 | Bakalash et al. | ......... | 707/999.01 |
| 7,333,982 B2 * | 2/2008 | Bakalash et al. | ............. | 707/600 |
| 2002/0169784 A1 * | 11/2002 | Cha et al. | ...................... | 707/102 |
| 2008/0071843 A1 * | 3/2008 | Papadimitriou et al. | ...... | 707/204 |
| 2008/0126045 A1 * | 5/2008 | Shan et al. | ........................ | 703/9 |
| 2010/0223276 A1 * | 9/2010 | Al-Shameri et al. | .......... | 707/769 |
| 2010/0235843 A1 * | 9/2010 | Appa et al. | .................... | 709/226 |

OTHER PUBLICATIONS

Li Hua & James E. Fowler, "Wavelet-Based Coding of Time-Varying Vector Fields of Ocean-Surface Winds" IEEE Transactions on Geoscience and Remote Sensing, vol. 42, No. 6, Jun. 2004 (pp. 1283-1290).*
Romenski et al.—"Compressible Two-Phase Flows: Two-Pressure Models and Numerical Methods"—Univeristiy of Trento, Italy, 2003 (pp. 1-30).*
Banham et al._"Low Bit Rate Video Coding Using Robust Motion Vector Regeneration in the Decoder"—1994 IEEE Transactions on Image Processing, vol. 3, No. 5, Sep. 1994, (pp. 652-665).*
Zhu et al.—"Video Data Mining: Semantic Indexing and Event Detection from the Association Perspective"—IEEE Transaction on Knowledge and data Engineering, vol. 17, No. 5, May 2005 (pp. 665-677).*
Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/GB2008/050388 dated Dec. 17, 2009.

(Continued)

*Primary Examiner* — Jean M Corrielus
*Assistant Examiner* — Anh Ly
(74) *Attorney, Agent, or Firm* — Buchanan, Ingersoll & Rooney PC

(57) ABSTRACT

A method of indexing multidimensional data obtains (302) a data set (210) describing features defined over at least one dimension other than time. Index data (212) comprising at least one value corresponding to the at least one non-time dimension is also obtained. The data set is compressed (306) and the index data is associated (308) with the compressed data set such that the compressed data set is identifiable by the index data.

13 Claims, 3 Drawing Sheets

OTHER PUBLICATIONS

Notification of Transmittal of the International Search Report and the Written Opinion of the International Searching Authority (Forms PCT/ISA/220, PCT7ISA/210 and PCT/ISA/237) in the corresponding International Application No. PCT/GB2008/050388 dated Oct. 31, 2008.

Hua et al., "Wavelet-Based Coding of Time-Varying Vector Fields of Ocean-Surface Winds" IEEE Transactions on Geoscience and Remote Sensing, 2004, vol. 42, No. 6, pp. 1283-1290, XP011113833.

Stegeman et al., "Overview of ICE Project: Integration of Computational Fluid Dynamics and Experiments" Report "NASA/TM 2001 210610", Glenn Research Center, National Aeronautics and Space Administration (NASA) 2001, pp. 1-87, XP002459684.

Yeung et al., "Video Visualization for Compact Presentation and Fast Browsing of Pictorial Content" IEEE Transactions on Circuits and Systems for Video Technology, 1997, vol. 7, No. 5, pp. 771-785, XP011014426.

\* cited by examiner

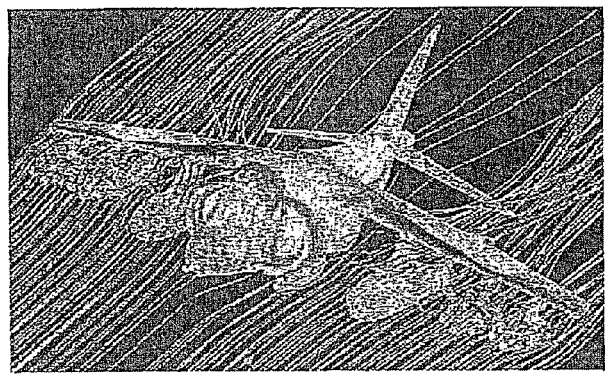
FIG. 1
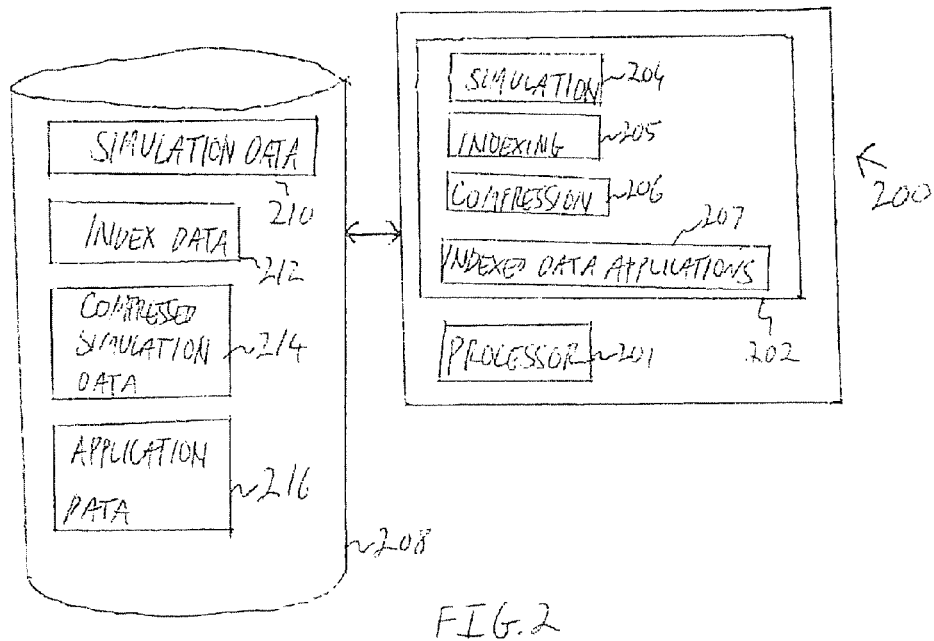
FIG. 2
| Compressed Data Set | Mach | AoA | ...other dimensions... |
|---|---|---|---|
| SD1 | 0.8 | 5 | |
| SD2 | 0.8 | 6 | |
| SD3 | 0.9 | 5 | |
| ... | | | |
| | | | |
Fig. 3A

DATA INDEXING AND COMPRESSION

This application is a continuation of International Application PCT/GB2008/050388 filed on May 29, 2008. The entire content of which is hereby incorporated in its entirety by reference.

FIELD

The present invention relates to indexing and compressing data.

BACKGROUND

Numerical simulation of physical processes for engineering design can result in very large data sets. For example, a single computational fluid dynamics (CFD) simulation for external aerodynamics (as illustrated in FIG. 1) can produce of the order of 10 GB of data. There is little ability in current simulation processes to make use of this data in later simulations, even if the features to be simulated subsequently are quite similar. This commonly means that large amounts of data are stored that have little scope for re-use, apart from reviewing the simulation characteristics that they originally model. Storing large amounts of data has well-known associated hardware and/or service cost implications.

When referring to the physical geometry of a product, most industrial design processes have a reasonably robust definition, either using "engineering terms" such as "wingspan", "number of wheels", "bar thickness", etc, or with a computer-aided design (CAD) definition involving mathematical specification of surfaces, intersections, topologies, etc. Many of these products interact with fluids (such as aircraft, boats, cars, computer chips, artificial hearts, etc). Although the fluid interaction is very important and it is possible to identify characteristics of the fluid flow, it is very difficult to compare "like flows" other than in fairly general terms.

Field specialists will often analyse a flow field in terms of apparent features, such as "stagnation points", "vortices", "boundary layer characteristics", "shock waves", etc, which are valid descriptors, but have their origins in physical experimentation and are intuitive in the sense that they exist in three dimensions. Current CFD simulation applications do not deal with or present data in these user-friendly terms, i.e. raw data is presented to an engineer who then uses that to identify and quantify the features of interest. Although it is possible to post-process a CFD file to obtain data that is more meaningful to an engineer, there is currently no system that automatically processes it in such a way so as to directly relate it to other data that has been produced in a similar manner.

SUMMARY

According to a first aspect of the present invention there is provided a method of indexing multidimensional data including: obtaining a data set describing features defined over at least one dimension other than time; obtaining index data comprising at least one value corresponding to the at least one non-time dimension; compressing the data set; storing the compressed data set, and associating the index data with the compressed data set such that the compressed data set is identifiable by the index data.

In some examples, the data set comprises numerical simulation data, which can include field data, such as computational fluid dynamics (CFD) simulation data representing fluid flow about an object (which may be in motion through a fluid field) and defined over time as well as other dimensions.

The index data may include a value for an engineering term (e.g. wingspan, number of wheels, bar thickness, velocity (e.g. expressed in Mach number) of a moving body in the simulation, material type) relating to the object, with the engineering term corresponding to one of the non-time dimension(s) of the data set. The index data may include a value for a field flow term (e.g. stagnation point, vortex, boundary layer characteristic, shock wave) relating to the fluid flow, with the field flow term corresponding to one of the non-time dimension(s) of the data set. The index data may include a value for a geometric term (e.g. medial axis, level set, spline coefficient) relating to a graphical representation of the fluid flow, with the geometric term corresponding to one of the non-time dimension(s) of the data set. The index data may include a value for a mathematical term (e.g. principal component, radial basis function, Eigenvalue decomposition) relating to a graphical or mathematical representation of the fluid flow, with the mathematical term corresponding to one of the non-time dimension(s) of the data set. The index data may include a value for a utility term (e.g. usage cost, safety/security, aesthetic appeal, weight, ease of use) relating to the fluid flow and/or the object, with the utility term corresponding to one of the non-time dimension(s) of the data set.

The method may be applied to a plurality of said data sets, thereby resulting in a plurality of compressed data sets, with each of the compressed data sets being associated with respective index data. Typically, the plurality of data sets will define their respective features over the same at least one non-time dimension.

The compression of the data set may include steps of: interpolating the data set onto a background (e.g. Cartesian) mesh decomposing the interpolation into wavelet coefficients using a wavelet function based on one of the non-time dimension (dimension-specific shape-function), and storing the wavelet coefficients.

The method may further include generating mapping data describing a relationship between a first said compressed data set and a second said compressed data set. The first and second compressed data sets may be related or similar; for example, the values (stored in the respective index data) of at least one of the non-time dimensions of the first and second data set may be the same. The mapping data may be in the form of a motion vector. The motion vector can describe a change between the first data set and the second data set in terms of at least one of the dimensions over which the data sets are defined. The method may further include analysing the mapping data to identify differences between the first and second data sets, and may further include displaying/storing data relating to the identified differences.

The first data set may include data representing a simulation of fluid flow about an object and the second data set may include data representing a record of actual (experimental) fluid flow about the object. The method may further include generating a graphical display using at least one of the compressed data sets and the mapping data. The graphical display may correspond to features of the data set selected by a user.

Where the plurality of data sets represent CFD simulation data, the first compressed data set may represent fluid flow about an object (e.g. an aircraft) having a plurality of features (e.g. a wing having particular dimensions), and the second compressed data set may represent fluid flow about an object having a plurality of features, at least one of the second object features being different to the corresponding feature of the first object (e.g. a wing having different dimensions). Alternatively, the second compressed data set may represent fluid flow about a feature that is different to the features of the object of the first data set. Alternatively, the second compressed data set may represent a perturbation to the fluid flow about the object of the first data set, i.e. the first and second compressed data sets represent the same object, but different fluid flows. If a suitable second compressed data set is not available then the method may include prior steps of generating a data set relating to the different object/object feature/fluid flow, compressing that data set and saving the compressed data set ("the second compressed data set").

According to a further aspect of the present invention there is provided a system configured to index multidimensional data, the system including: a device configured to obtain a data set describing features defined over at least one dimension other than time; a device configured to obtain index data comprising at least one value corresponding to the at least one non-time dimension; a device configured to compress the data set; a device configured to store the compressed data set, and a device configured to associate the index data with the compressed data set such that the compressed data set is identifiable by the index data.

According to another aspect of the present invention there is provided a computer program product comprising computer readable medium, having thereon computer program code means, when the program code is loaded, to make the computer execute a method of indexing multidimensional data including: obtaining a data set describing features defined over at least one dimension other than time; obtaining index data comprising at least one value corresponding to the at least one non-time dimension; compressing the data set; storing the compressed data set, and associating the index data with the compressed data set such that the compressed data set is identifiable by the index data.

According to another aspect of the present invention, there is provided a method of compressing multidimensional data including: obtaining a data set defined over at least one non-time dimension, the data set having been interpolated onto a background mesh; decomposing the interpolated data set into wavelet coefficients using a wavelet function based on one of the non-time dimension (dimension-specific shape-function), and storing the coefficients.

Whilst the invention has been described above, it extends to any inventive combination of the features set out above or in the following description. Although illustrative embodiments of the invention are described in detail herein with reference to the accompanying drawings, it is to be understood that the invention is not limited to those precise embodiments. As such, many modifications and variations will be apparent to practitioners skilled in this art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

DESCRIPTION OF THE DRAWINGS

The invention may be performed in various ways, and, by way of example only, embodiments thereof will now be described, reference being made to the accompanying drawings, in which:

FIG. 1 is a graphical representation of external aerodynamics for an aircraft produced by a simulation application;

FIG. 2 illustrates schematically a computer and storage device configured to use and store simulation data;

FIG. 3A is a schematic illustration of index data;

DETAILED DESCRIPTION

Figure 3:
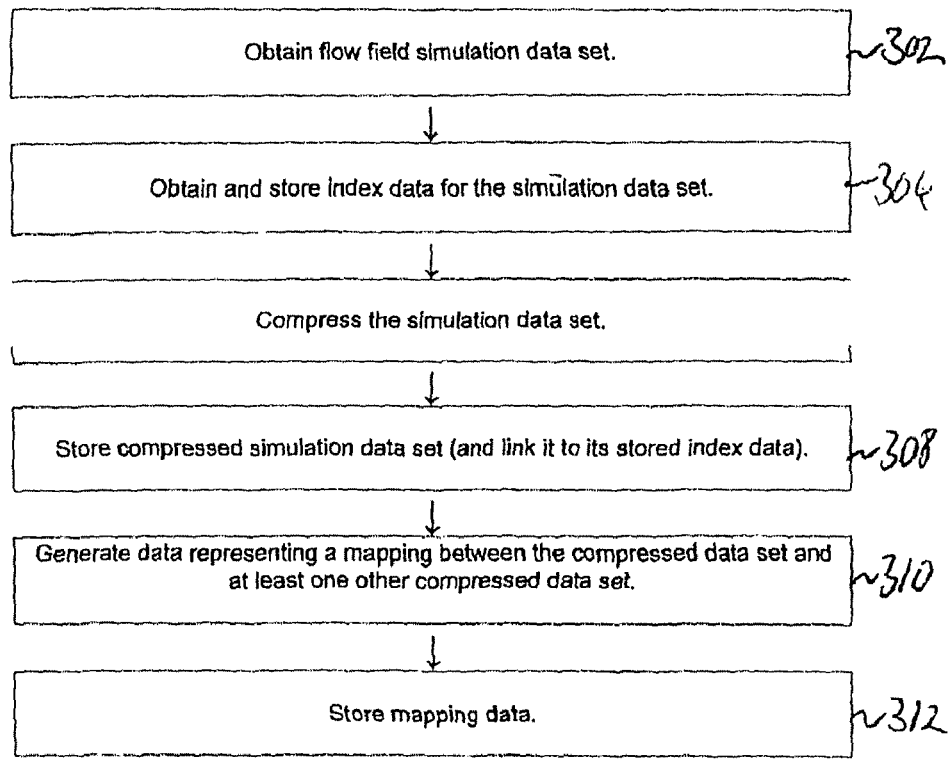
FIG. 3 illustrates schematically steps performed by the computer in order to generate indexed compressed data.

FIG. 2 shows a computer 200 that includes a processor 201 and internal random access memory 202. The computer may be a desktop personal computer or the like. The internal memory 202 includes executable code for a simulation application 204; an application 205 for associating index data with other data; a data compression application 206 and further applications 207 that use indexed data. It will be understood that the illustrated configuration is exemplary only and the functions performed by the applications as described herein could be executed by a single integrated application, or by various combinations of separate hardware/software modules.

The computer 200 can exchange data with non-volatile storage 208. In some cases the non-volatile storage may comprise a hard-disk or the like that is directly connected to the computer, but when large amounts of data need to be stored then the storage 208 may be a high-volume external storage device/service that is accessed over a network. In the example the storage 208 contains simulation data 210 that is generated by the simulation application 204; index data 212 that is used and/or generated by indexing application 205; compressed simulation data 214 that can be generated by the compression application 206 and further data 216 that may be used and/or generated by the application 207. It will be understood that the various types of data could be stored on separate storage devices.

Although the example described herein relates to a data generated by a CFD simulation application, it will be understood that the methods can be applied to high-volume compressible data involved in, or generated by, other types of applications, such as simulations for finite element modelling of structures; electromagnetic fields; stress design and acoustics. Turning to FIG. 3, steps performed by the code executing on computer 200 for generating compressed indexed simulation data are illustrated. At step 302 detailed simulation data 210 is obtained by the indexing application 205. This data will normally be generated by the simulation application 204, which may be a conventional CFD simulation application, such as CFX (produced by Ansys, Inc of Canonsburg, Pa., USA) or the simulation applications produced by Fluent, Inc of Lebanon, N.H., USA. Such simulation applications receive input in the form of a description of body, such as a vehicle, and properties of a fluid (e.g. air) in which it is it located or travels and output data describing flow of the fluid around the body. The output data can be in a standard form, e.g. files typically containing gigabytes of real (including higher precision) values representing the state of the flow field variables at certain waypoints and at the termination of the simulation.

The user of the simulation application 204 will be aware of various properties of the body and fluid involved in the simulation. Typically, he will enter design parameters of the body. For example, when the body is an aircraft, the parameters (entered by means of a CAD package, for instance) can include details of physical features of the craft, such as wingspan, as well as other properties of the body that will affect the simulation, e.g. the velocity and angle of attack of the craft. In other instances, the user may specify characteristics (e.g. viscosity) of the fluid. Clearly, the various dimensions/properties of a particular simulation will determine the simulation data output, but at least some of these properties (e.g. a gauge of the aesthetic appeal of a vehicle under design) may not be directly stored in the data, whilst others may not be easily accessed without loading the data into the simulation application or other application.

At step 304 the data indexing application 205 obtains index data 212. The index data corresponds to properties of the simulation as discussed above. These properties may be automatically extracted from the simulation data 210, but they will normally exist before the field flow simulation data was generated and so the index data could be created independently by a user, e.g. by selection from a menu. These properties can also form the index for exploiting the indexed data that is generated.

It will be understood that types of properties/dimensions that may be considered to have less "intuitive engineering" value than the wingspan, etc, features mentioned above could be used. Examples include geometric parameters for a graphical display of the fluid flow, such as spline coefficients. Even more general, though less intuitive again, topological descriptors for the geometry could be used, such as medial axes or level sets. More abstract mathematical bases such as principal components, radial basis functions, eignvalue decompositions, could also be used. Another option is to use functions of utility such as cost, security, novelty, aesthetics. A non-exhaustive list of examples includes the following:

a. Engineering variables, such as span, sweep, material type, number of wheels, bar thickness, velocity (e.g. expressed in Mach number) of a moving body in the simulation, material type b. Field flow terms, e.g. stagnation point, vortex, boundary layer characteristic, shock wave c. Mathematical dimensions, such as orthogonal decomposition components, medial axis, level set, spline coefficient, principal component, radial basis function, Eigenvalue decomposition d. Business/utility dimensions, such as cost, weight, durability, ease of manufacture/use, safety/security, aesthetic appeal.

FIG. 3A illustrates a simple example of how the index data 212 could be stored in a table. A first set of simulation data has been generated for an aircraft at an angle of attack (aoa) 5 degrees and travelling a velocity of Mach number 0.8. A second set of simulation data has also been generated for the aircraft at an aoa of 6 degrees and Mach number 0.8. A third simulation data set corresponds to the aircraft being at an aoa of 5 degrees and Mach number 0.9. These values are shown in the simple table data structure of FIG. 3A, but it will be understood that they could be stored in other ways, which will be readily apparent to the skilled person, e.g. a tagged list such as a Microsoft Excel spreadsheet, XML or database keys, with real or integer valued arguments. In the table illustrated, row 352 contains values for the properties of the first simulation data set. The row 352 also includes a link/reference to a data file named SD1, which contains a compressed version of the first data set, which will be discussed below. Rows 354 and 356 contain data relating to the second and third data sets, respectively. It will be understood that values for various other properties/dimensions, such as the mentioned in this specification, can also be stored. Normally, all the columns will be completed for all rows, but in some cases this is not essential.

At step 306 the obtained simulation data 210 is compressed to produce compressed data 214. After this, the original simulation data may discarded, which could be desirable for saving storage space (and associated costs). Various suitable compression techniques will be known to the skilled person, but the compression approach used in the example is to interpolate the simulated field flow data onto a Cartesian, or other suitable background, mesh (if necessary); decompose the interpolation into wavelet coefficients and store the coefficients. This type of compression technique is well established in the field of video compression. What is being achieved in the interpolation step in mathematical terms is the projection of the raw simulation data onto a basis (e.g. Fourier decomposition; Discrete cosine transform; Discontinuous Galerkin interpolation; Integer representation (i.e. compression by truncating the precision of the data); Radial basis decomposition or Step/delta function projection). This Cartesian-interpolated data is typically stored in the form of files of real-valued data interpolated to the vertices (or cell centres) of regularly-spaced points in the flow domain. This allows coefficient data to be computed and stored, which requires much less storage space than the full simulation data.

The skilled person will be familiar with a mathematical technique known as wavelet compression that underlies the known MPEG video coding algorithm, and thus MP3 compression. Other related known compression algorithms that will assist the skilled person with understanding and implementing the techniques describe herein include the Xvid video codec, which is an open source software project distributes through the terms of the GNU PL. For assistance with understanding the example given herein, an outline of the MPEG compression technique will now be given. The MPEG compression ratio is very high, because the algorithm makes use of "translation invariance" (also called "shift invariance"), i.e. the algorithm can recognise when something in a video image is simply moving from one place to another, but not changing. The algorithm is generally implemented in 2D.

The "shift invariance" of a video stream can be calculated in many ways, but one of the most common (and effective) known techniques is called "block motion detection". When transmitting a sequence of video frames from a sender to a receiver, the signal for each new frame can be split into two parts: the first allows the receiver to construct an approximation of the frame from a set of 'motion vectors' mapping blocks of pixels from previous frames to the new one. A subsequent update to this approximation can be sent as a 'residual frame', which normally takes more bandwidth. A comparable step of calculating and restoring residual data for the simulation data can be performed at step 306.

A mathematical concept known as a "wavelet" is a very useful tool for enabling block motion detection and hence data compression. A wavelet is formally a basis for compact support of a function, whose coefficients are determined by convolution of the signal with a shape function defining the wavelet series. The standard wavelet compression equation for time-series signals is:

$$C_{a,b} = \int_R s(t) \frac{1}{\sqrt{a}} \overline{\psi\left(\frac{t-b}{a}\right)} dt$$

where s(t) is the signal, or complete set of data to be compressed in t (time), $\psi$ is a shape function, a is a scale (the size of the wavelet we are compressing to), b is the displacement and $C_{a,b}$ are the resulting wavelet coefficients. Software for achieving this, such as "MATlab" simulation products produced by The MathWorks, Inc of MA, USA, is available.

The implementation of the compression application 206 can be based on extending the compression and resultant data-indexing made possible by motion vector detection for image compression in order to allow compression of data in higher (non-time) dimensions that correspond to the properties/dimensions of the index data. This can result in a shift-invariant compression for an arbitrary-dimensional space, based on a shape function that can be customised for each dimension (for any form of space that supports numerical integration). Thus, motion detection techniques can be used to track (changes in) features in numerical simulation data. Domain-specific shape-functions (w) can be used for any given dimension. As most current wavelet functions are inherently "smooth", a way of capturing "sharp features" can be devised. Such a function might have a 3D edge with a displacement and rotation vectors associated with it. Approximations, such as projecting onto regular spaces, may be embedded within the compression technique.

At step 308 the index data is associated with the compressed data. It will be appreciated that there are several ways of doing this. The table of FIG. 3A is one method, but an alternative would be to embed the index data within the compressed data 214. It will be understood that the steps can be repeated in order to process other simulation data sets/files in a similar manner.

Steps 310 to 312 are optional and demonstrate how the compressed indexed data can be used. At step 310 data representing a mapping between one compressed indexed data set and at least one other compressed indexed data set is generated. The mapping data may be in the form of motion vectors, or in some instances could be a field representation (i.e. store motion vectors for every vertex on a coarse version of the mesh, and then interpolate the value at intermediate values). The mapping data can record differences and/or correlations between data sets.

Such mapping data can be put to various uses. For example, an initial data set in a series of detailed simulation data files can be compared with a subsequent simulation data set. This means that storing the initial data, substantially in its entirety, along with the mapping data describing the differences between it and the subsequent data set, can make it possible to substantially reconstruct the subsequent data set by modifying the initial data set according to the stored changes. This process can be repeated for further subsequent data sets in the detailed simulation data. Other uses include finding correlations between data sets and simulating/approximating the effect of adding/modifying a design feature present in processed simulation data set. Subsequent simulations (such as a particular aircraft moving at a slightly higher Mach number) can be produced and the raw simulation data files can be subjected to the same rapid process. It is then possible to generate a set of motion vectors that map correlated areas of the flow between simulations. This is independent of an understanding about what the flow is, or what a shockwave, for example, means to the rest of the flow. However, it is a potentially powerful tool in predicting the effect of changes to existing simulations, and also to the combination of changes. More detailed examples of such uses of the data generated by the method will now be given.

Figure 4:
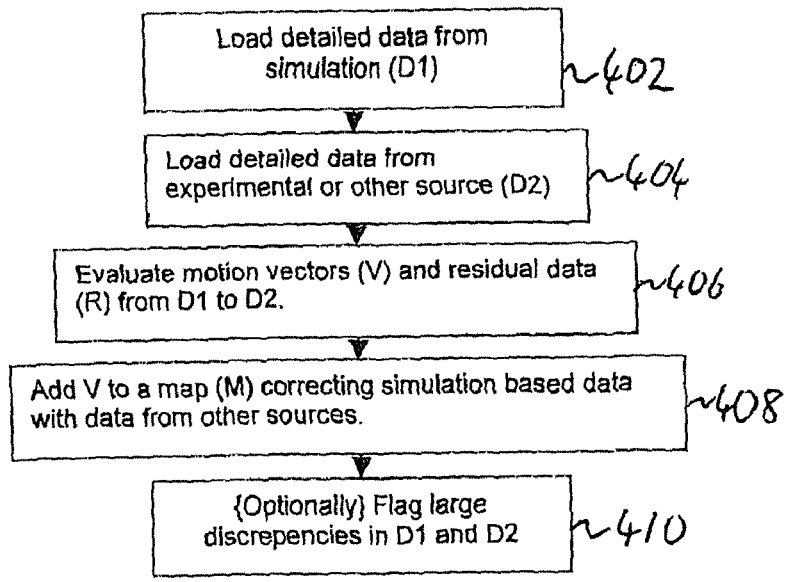
FIG. 4 illustrates schematically steps performed by the data compression application in order to correlate sets of data.

At step 402 of FIG. 4 a first set of detailed simulation data D1 is loaded into the application, in a similar manner to step 302 above. At step 404, a second set of detailed data D2 is loaded. This data can include the same type of dimensions as D1, but can be the result of experimental measurements or another source, e.g. an alternative simulation data generation application. Thus, one use of the process of FIG. 4 can be to compare the accuracy of data produced by a simulation application, e.g. 204, for fluid flow about a particular design of vehicle with empirical data showing the actual fluid flow about the vehicle during a physical test.

At step 406 motion vectors and residual data are evaluated to generate data indicating differences between D1 and D2, following their compression and indexing. At step 408 a map that corrects the simulation data D1 in view of the other data D2 is generated using the motion vectors. Optionally, at step 410 large discrepancies between D1 and D2 can be flagged/recorded for review.

Figure 5:
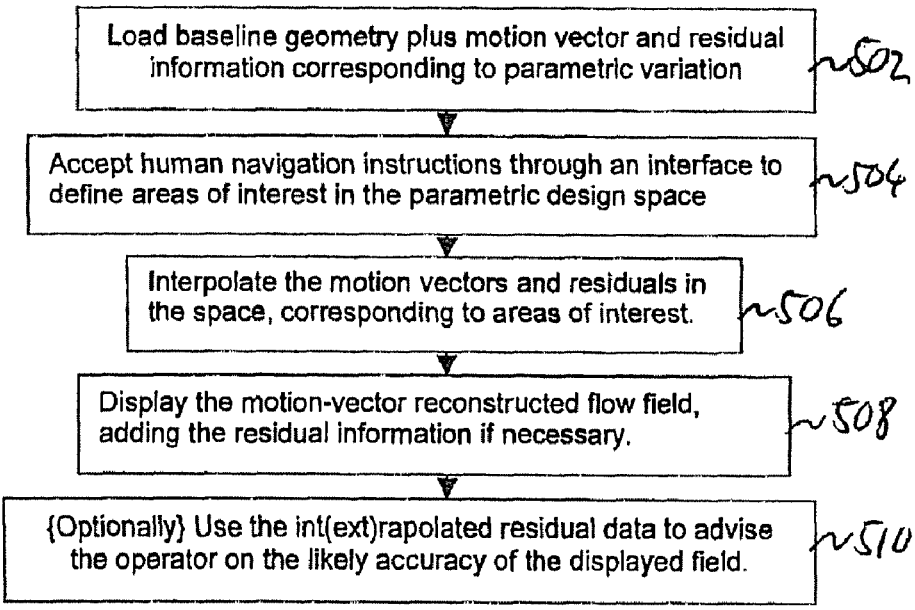
FIG. 5 illustrates schematically steps performed by the simulation and/or data compression applications in order to display simulation data.

FIG. 5 illustrates steps that can be performed using motion vector and residual data (that was stored as the result of steps 310-312 above, for example) in order to display a corresponding flow field. At step 502 baseline geometry and motion vector and residual data is loaded into an application that is intended to produce a display of a flow field about a body.

At step 504 a user inputs data via an interface to define areas of interest in the parametric design space, e.g. a particular feature such as a wingtip of a vehicle. At step 506 the motion vectors and residuals in the space corresponding to the areas of interest identified by the user are interpolated in a similar manner to that described above. At step 508 the flow field reconstructed using the motion vectors is displayed. The residual data can be added to provide more detail if necessary/requested by the user. Optionally at step 510 the interpolated/extrapolated residual data is used as the basis for advising the user on the likely accuracy of the field displayed at step 508.

An example of this process using the aircraft flow field simulation data mentioned previously would be to obtain a rapid visualisation of the flow for a particular set of parameters, e.g. aoa=6 degrees, Mach Number=0.9. A human-friendly image can be produced by the system by superposition of the motion vectors (which will not smear out any discontinuities such as shocks) at the rate of a frame update (i.e. as fast as a human can see it) for the new data set. The data set will be inaccurate, but if the human operator is rapidly scanning through a range of parameters (interactively) by motion-vector approximation, he will still be able to notice that at one particular set of engineering variable settings, wing efficiency is maximised, but a shock impinges on a nacelle/pylon junction, for example. This solution is worth closer examination and in the same way as the image correction vector is applied after the motion vector approximation in a video stream, the human operator can initiate a full simulation of the new scenario. This will further enrich the data store, and provide more points of reference for flow reconstruction.

Figure 6:
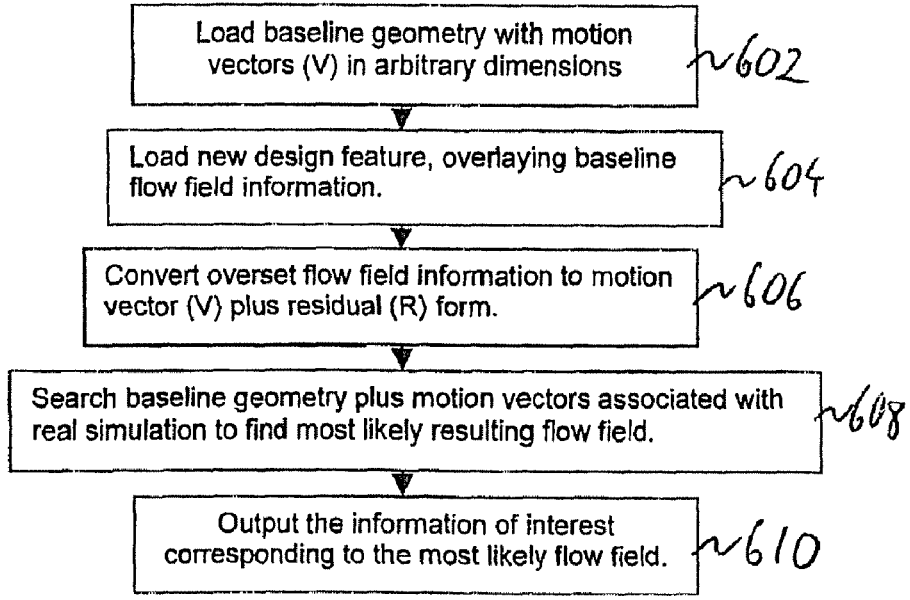
FIG. 6 illustrates schematically steps performed by the simulation and/or data compression applications in order to simulate the effects of new design features.

FIG. 6 illustrates steps that can be performed using motion vector and residual data in order to estimate the effect of modifying features of a design for which a fluid flow simulation data has been generated. At step 602 baseline geometry with motion vectors in arbitrary dimensions are loaded into a simulation application. At step 604 data representing the new design feature is loaded into the simulation application. This data could be a CAD description of the geometry plus freestream variables (speed, angle of attack, etc), and/or data presented in terms of the index data dimensions. The new feature data is overlaid on the corresponding part of the underlying geometry data loaded at step 602 and corresponding fluid flow simulation data is generated.

At step 606 the fluid flow data generated at step 604 is used to generate motion vector and residual data (using techniques similar to those described above), based on differences between the fluid flow for the new feature and the fluid flow for the corresponding feature/area in the original data loaded at step 602.

At step 608 baseline geometry and/or motion vectors associated with real simulations of the body are searched in order to find a flow field that is most likely to result from the new design feature. This data can be generated using the techniques discussed above. Motion vectors (and some residual data) can be computed and added to the data store whenever a simulation is produced. This might be viewed as ongoing domain-independent enrichment of a simulation Knowledge Base. The search can be a reverse lookup, and examples of modes of operation include:

1. Full simulations for design A and design B have been produced, along with motion vectors from A to B (MV1), and motion vectors from A to C, which is a perturbation to A (MV2). An estimate of the effect of a simulation perturbation to B is needed and this can be obtained by adding MV2 to the simulation for B. MV1 could also be used a form of correction.

2. It is desired to work out how to achieve a particular flow field effect, starting from a particular baseline A. A large amount of data has been gathered from parametric exploration around a design B, which is similar to A. A region of the flow domain in A is manually selected and a motion vector is input. The motion vector and location (transposed by the motion vector from A to B) is then correlated against motion vectors resulting from specific design changes. The most likely candidate(s) are then presented to the designer as worthy of investigation. They may even be superimposed on the image the designer is working with at the time, by way of suggestion.

3. Design A is similar to design B (whose design space is well explored). The motion vectors MV from B to A are computed and a parametric variation is applied to A, and the same variation in B is looked up (A and B in this example are described by the same type of engineering parameters). The motion vectors MV2 corresponding to this parametric variation in B are calculated, add these are added to MV and displayed as the likely outcome of applying the perturbation to A.

At step 610 information of interest corresponding to the most likely fluid flow found at step 608 is displayed.

Examples of the benefits offered by the techniques described above include compression of vast amounts of numerical simulation data (for example computational fluid dynamics data) to arbitrary accuracy; interpolated or otherwise reconstructed data in order to facilitate a human interface to a lower-fidelity simulation process; the construction of a mathematical link (map) between a product definition (e.g. CAD geometry) and the fluid physics related to it in order to estimate multi-disciplinary trade studies.

As one practical example, assume that a full-field steady-state set of computational fluid dynamics (CFD) data (10 GB per simulation) has been produced for a 20-dimensional design space (wing chord, thickness, sweep angle, crank location, etc) with a design of experiments totalling 3000 evaluations. Storing this data (30TB) on a fully backed up commercial system would be expensive, e.g. a rate of £20K/TB/year would result in cost of £600K per annum. However, a compressed version of the data with sufficient accuracy to re-post process it for engineering purposes could be stored instead. In the example 20 dimensions are used as the compression axes, and (as the integral may be calculated linearly—though it does not have to be) distributed computing is used to evaluate wavelet coefficients and block motion vectors for the complete dataset. Though the fluid flow features are moving about in space from one simulation to the next (as the geometry changes) the wavelets can efficiently track their movement. Acceptably lossy compression for post-processing at 10:1 can be achieved and so the new cost of annual storage would be £60K per annum.

In another example similar to the above, a designer wishes to explore the design space visually in order to "get a feel" for the way that the flow is changing with design decisions. The compression ratio might now be 100:1 and so the data storage cost would drop to £6K per annum. In yet another example, assume that there is an existing set of coefficients C for a previous design that has been well validated. The effect of a design choice for a new product needs to be evaluated. It is possible to correlate the wavelet coefficients describing the new product with the old, in effect the compression can be considered to be a "memory" of a designer's "tacit knowledge base".

The invention claimed is:

1. A method of indexing multidimensional data including:
   obtaining a data set describing features defined over at least one dimension other than time;
   obtaining index data comprising at least one value corresponding to the at least one non-time dimension;
   compressing the data set;
   storing the compressed data set;
   associating the index data with the compressed data set such that the compressed data set is identifiable by the index data;
   generating mapping data describing a relationship between a first said compressed data set and a second said compressed data set; and
   analysing the mapping data to identify differences between the first and second data sets,
   wherein the mapping data is in the form of a motion vector describing a change between the first data set and the second data set in terms of at least one of the dimensions over which the data sets are defined.

2. The method according to claim 1, wherein the data set comprises numerical simulation data, such as computational fluid dynamics (CFD) simulation data representing fluid flow about an object.

3. The method according to claim 2, wherein the index data includes a value for an engineering term such as wingspan, number of wheels, bar thickness, velocity of a moving body in the simulation, and material type that relate to the object, with the engineering term corresponding to the at least one non-time dimension of the data set.

4. The method according to claim 3, wherein the index data includes a value for a field flow term such as stagnation point, vortex, boundary layer characteristic, and shock wave that relate to the fluid flow, with the field flow term corresponding to the at least one non-time dimension of the data set.

5. The method according to claim 4, wherein the method is applied to a plurality of said data sets, thereby resulting in a plurality of compressed data sets, with each of the compressed data sets being associated with respective said index data.

6. The method according to claim 5, wherein the compression of the data set includes steps of:
   interpolating the data set onto a background mesh;
   decomposing the interpolation into wavelet coefficients using a wavelet function based on the at least one non-time dimension, and
   storing the wavelet coefficients.

7. The method according to claim 2, wherein the index data includes a value for a field flow term such as stagnation point, vortex, boundary layer characteristic, and shock wave that relate relating to the fluid flow, with the field flow term corresponding to the at least one non-time dimension of the data set.

8. The method according to claim 1, wherein the method is applied to a plurality of said data sets, thereby resulting in a plurality of compressed data sets, with each of the compressed data sets being associated with respective said index data.

9. The method according to claim 1, wherein the compression of the data set includes steps of:
- interpolating the data set onto a background mesh;
- decomposing the interpolation into wavelet coefficients using a wavelet function based on the at least one non-time dimension, and
- storing the wavelet coefficients.

10. A system configured to index multidimensional data, the system including:
- a device configured to obtain a data set describing features defined over at least one dimension other than time;
- a device configured to obtain index data comprising at least one value corresponding to the at least one non-time dimension;
- a device configured to compress the data set;
- a device configured to store the compressed data set,
- a device configured to associate the index data with the compressed data set such that the compressed data set is identifiable by the index data;
- a device configured to generate mapping data describing a relationship between a first said compressed data set and a second said compressed data set; and
- a device configured to analyze the mapping data to identify differences between the first and second data sets,
- wherein the mapping data is in the form of a motion vector describing a change between the first data set and the second data set in terms of at least one of the dimensions over which the data sets are defined.

11. A method of indexing multidimensional data comprising:
- obtaining a plurality of data sets, each data set describing features defined over at least one dimension other than time;
- obtaining index data comprising at least one value corresponding to the at least one non-time dimension of each data set;
- compressing each data set by interpolating the data set onto a background mesh, decomposing the interpolation into wavelet coefficients using a wavelet function based on the at least one non-time dimension, and storing the wavelet coefficients;
- storing each compressed data set;
- associating the index data with a respective compressed data set such that the compressed data set is identifiable by the index data; and
- generating mapping data describing a relationship between a first compressed data set and a second compressed data set,
- wherein each data set comprises numerical simulation data, such as computational fluid dynamics (CFD) simulation data representing fluid flow about an object,
- wherein the index data includes a value for an engineering term relating to the object, with the engineering term corresponding to the at least one non-time dimension of the respective data set, and a value for a field flow term relating to the fluid flow, with the field flow term corresponding to the at least one non-time dimension of the respective data set.

12. A method of indexing multidimensional data including:
- obtaining a data set describing features defined over at least one dimension other than time;
- obtaining index data comprising at least one value corresponding to the at least one non-time dimension;
- compressing the data set;
- storing the compressed data set,
- associating the index data with the compressed data set such that the compressed data set is identifiable by the index data; and
- generating mapping data describing a relationship between a first said compressed data set and a second said compressed data set, wherein the mapping data is in the form of a motion vector describing a change between the first data set and the second data set in terms of at least one of the non-time dimensions over which the data sets are defined and further including analysing the mapping data to identify differences between the first and second data sets, wherein the data set comprises numerical simulation data, such as computational fluid dynamics (CFD) simulation data representing fluid flow about an object, wherein the index data includes a value for an engineering term such as wingspan, number of wheels, bar thickness, velocity of a moving body in the simulation, and material type relating to the object, with the engineering term corresponding to the at least one non-time dimension of the data set.

13. A method of indexing multidimensional data including:
- obtaining a data set describing features defined over at least one dimension other than time;
- obtaining index data comprising at least one value corresponding to the at least one non-time dimension;
- compressing the data set;
- storing the compressed data set;
- associating the index data with the compressed data set such that the compressed data set is identifiable by the index data; and
- generating mapping data describing a relationship between a first said compressed data set and a second said compressed data set, wherein the mapping data is in the form of a motion vector describing a change between the first data set and the second data set in terms of at least one of the non-time dimensions over which the data sets are defined and further including analysing the mapping data to identify differences between the first and second data sets, wherein the data set comprises numerical simulation data, such as computational fluid dynamics (CFD) simulation data representing fluid flow about an object, wherein the index data includes a value for a field flow term such as stagnation point, vortex, boundary layer characteristic, and shock wave that relate to the fluid flow, with the field flow term corresponding to at least one non-time dimension of the data set.

\* \* \* \* \*

UNITED STATES PATENT AND TRADEMARK OFFICE
CERTIFICATE OF CORRECTION

| | |
|---|---|
| PATENT NO. | : 8,073,824 B2 |
| APPLICATION NO. | : 12/177586 |
| DATED | : December 6, 2011 |
| INVENTOR(S) | : Jamil Appa et al. |

It is certified that error appears in the above-identified patent and that said Letters Patent is hereby corrected as shown below:

Title Page, item (63) Related U.S. Application Data: Insert --Continuation of application No. PCT/GB2008/050388, filed on May 29, 2008--.

Signed and Sealed this
Seventeenth Day of April, 2012

David J. Kappos
*Director of the United States Patent and Trademark Office*